United States Patent
Biswas et al.

(10) Patent No.: US 8,458,406 B2
(45) Date of Patent: Jun. 4, 2013

(54) MULTIPLE CRITICAL WORD BYPASSING IN A MEMORY CONTROLLER

(75) Inventors: Sukalpa Biswas, Fremont, CA (US); Hao Chen, San Ramon, CA (US); Brian P. Lilly, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 263 days.

(21) Appl. No.: 12/955,699

(22) Filed: Nov. 29, 2010

(65) Prior Publication Data

US 2012/0137078 A1    May 31, 2012

(51) Int. Cl.
*G06F 2/00* (2006.01)

(52) U.S. Cl.
USPC ............... 711/130; 711/154; 711/E12.001; 711/E12.038

(58) Field of Classification Search
USPC ............... 711/130, 154, E12.001, E12.038
See application file for complete search history.

(56) References Cited

U.S. PATENT DOCUMENTS

| | | | |
|---|---|---|---|
| 5,668,975 | A | 9/1997 | Coddington |
| 6,272,601 | B1 | 8/2001 | Nunez et al. |
| 2005/0172091 | A1* | 8/2005 | Rotithor et al. ............... 711/157 |
| 2010/0211742 | A1 | 8/2010 | Turullols et al. |

FOREIGN PATENT DOCUMENTS

WO    2010/069398    6/2010

OTHER PUBLICATIONS

Jongsun Kim, et al., A Cost-Effective Latency-Aware Memory Bus for Symmetric Multiprocessor Systems, IEEE Transactions on Computers, vol. 57, No. 12, Dec. 2008, 7 pages.

* cited by examiner

*Primary Examiner* — Jasmine Song (74) *Attorney, Agent, or Firm* — Lawrence J. Merkel; Meyertons, Hood, Kivlin, Kowert & Goetzel, P.C.

(57) ABSTRACT

In one embodiment, a memory controller may be configured to transmit two or more critical words (or beats) corresponding to two or more different read requests prior to returning the remaining beats of the read requests. Such an embodiment may reduce latency to the sources of the memory requests, which may be stalled awaiting the critical words. The remaining words may fill a cache block or other buffer, but may not be required by the sources as quickly as the critical words in order to support higher performance. In some embodiments, once a remaining beat of a block is transmitted, all of the remaining beats may be transmitted contiguously. In other embodiments, additional critical words may be forwarded between remaining beats of a block.

19 Claims, 9 Drawing Sheets

MULTIPLE CRITICAL WORD BYPASSING IN A MEMORY CONTROLLER

BACKGROUND

1. Field of the Invention

This invention is related to the field of memory controllers.

2. Description of the Related Art

Digital systems generally include a memory system formed from semiconductor memory devices such as static random access memory (SRAM), dynamic random access memory (DRAM), synchronous DRAM (SDRAM), double data rate (DDR, DDR2, DDR3, etc.) SDRAM including low power versions (LPDDR, LPDDR2, etc.) SDRAM, etc. The memory system is volatile, retaining data when powered on but not when powered off, but also provides low latency access as compared to nonvolatile memories such as Flash memory, magnetic storage devices such as disk drives, or optical storage devices such a compact disk (CD), digital video disk (DVD), and BluRay drives.

The memory devices forming the memory system have a low level interface to read and write the memory according to memory device-specific protocols. The sources that generate memory operations typically communicate via a higher level interface such as a bus, a point-to-point packet interface, etc. The sources can be processors, peripheral devices such as input/output (I/O) devices, audio and video devices, etc. Generally, the memory operations include read memory operations to transfer data from the memory to the device and write memory operations to transfer data from the source to the memory. Read memory operations may be more succinctly referred to herein as read operations or reads, and similarly write operations may be more succinctly referred to herein as write operations or writes.

Accordingly, a memory controller is typically included to receive the memory operations from the higher level interface and to control the memory devices to perform the received operations. The memory controller generally also includes queues to capture the memory operations, and can include circuitry to improve performance. For example, some memory controllers schedule read memory operations ahead of earlier write memory operations that affect different addresses.

Typically, a block of data is returned by the memory controller in response to a read memory operation. For example, a block may be the size of a cache line of data in the system including the memory controller. The block is generally returned as several transmissions of data over an interconnect that is narrower than a block. Each data transmission on the interconnect is referred to as a "beat" of data. Thus, a block may be transferred as N beats of data, where N times the width of the interconnect is equal to the size of the block. The beat of data that includes one or more bytes addressed by the address in the read request is typically returned first, followed immediately by the remaining beats of the block.

SUMMARY

In one embodiment, a memory controller may be configured to transmit two or more critical words (or beats) corresponding to two or more different read requests prior to returning the remaining beats of the read requests. Such an embodiment may reduce latency to the sources of the memory requests, which may be stalled awaiting the critical words. The remaining words may fill a cache block or other buffer, but may not be required by the sources as quickly as the critical words in order to support higher performance. In some embodiments, once a remaining beat of a block is transmitted, all of the remaining beats may be transmitted contiguously. In other embodiments, additional critical words may be forwarded between remaining beats of a block. In some embodiments, quality of service (QoS) parameters may be supported for each memory operation, and critical word forwarding may be based on QoS if more than one critical word is available for forwarding. In some embodiments, a critical word may be forwarded even if the remaining words are not yet ready for forwarding.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/ components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Overview

Figure 1:
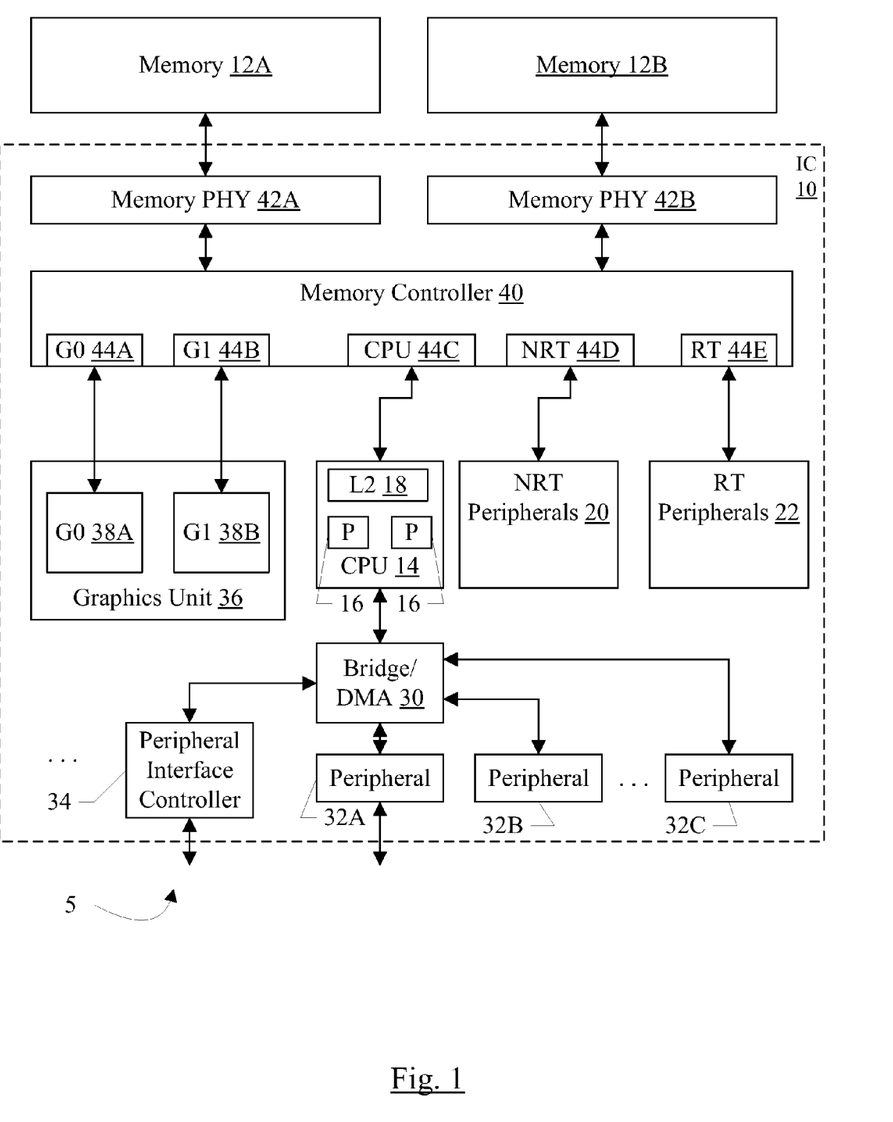
FIG. 1 is a block diagram of one embodiment of a system including a memory controller.

Turning now to FIG. 1, a block diagram of one embodiment of a system 5 is shown. In the embodiment of FIG. 1, the system 5 includes an integrated circuit (IC) 10 coupled to external memories 12A-12B. In the illustrated embodiment, the integrated circuit 10 includes a central processor unit (CPU) block 14 which includes one or more processors 16 and a level 2 (L2) cache 18. Other embodiments may not include L2 cache 18 and/or may include additional levels of cache. Additionally, embodiments that include more than two processors 16 and that include only one processor 16 are contemplated. The integrated circuit 10 further includes a set of one or more non-real time (NRT) peripherals 20 and a set of one or more real time (RT) peripherals 22. In the illustrated embodiment, the CPU block 14 is coupled to a bridge/direct memory access (DMA) controller 30, which may be coupled to one or more peripheral devices 32A-32C and/or one or more peripheral interface controllers 34. The number of peripheral devices 32 and peripheral interface controllers 34 may vary from zero to any desired number in various embodiments. The system 5 illustrated in FIG. 1 further includes a graphics unit 36 comprising one or more graphics controllers such as G0 38A and G1 38B. The number of graphics controllers per graphics unit and the number of graphics units may vary in other embodiments. As illustrated in FIG. 1, the system 5 includes a memory controller 40 coupled to one or more memory physical interface circuits (PHYs) 42A-42B. The memory PHYs 42A-42B are configured to communicate on pins of the integrated circuit 10 to the memories 12A-12B. The memory controller 40 also includes a set of ports 44A-44E. The ports 44A-44B are coupled to the graphics controllers 38A-38B, respectively. The CPU block 14 is coupled to the port 44C. The NRT peripherals 20 and the RT peripherals 22 are coupled to the ports 44D-44E, respectively. The number of ports included in a memory controller 40 may be varied in other embodiments, as may the number of memory controllers. That is, there may be more or fewer ports than those shown in FIG. 1. The number of memory PHYs 42A-42B and corresponding memories 12A-12B may be one or more than two in other embodiments.

Generally, a port may be a communication point on the memory controller 40 to communicate with one or more sources. In some cases, the port may be dedicated to a source (e.g. the ports 44A-44B may be dedicated to the graphics controllers 38A-38B, respectively). In other cases, the port may be shared among multiple sources (e.g. the processors 16 may share the CPU port 44C, the NRT peripherals 20 may share the NRT port 44D, and the RT peripherals 22 may share the RT port 44E). Each port 44A-44E is coupled to an interface to communicate with its respective agent. The interface may be any type of communication medium (e.g. a bus, a point-to-point interconnect, etc.) and may implement any protocol. The interconnect between the memory controller and sources may also include any other desired interconnect such as meshes, network on a chip fabrics, shared buses, point-to-point interconnects, etc.

Data may be returned to the sources on each port for read memory operations as multiple beats on the interface. The address generated by the source may identify a critical word within the block of data being read. The block of data may be any size. For example, the block of data may be a cache block, or any other size block that is supported on the interface. The memory controller 40 may be configured to return the beat that includes the critical word as an initial beat of the block. The remaining beats of the block may be transmitted after the critical word beat. In one embodiment, the critical word may be considered to be the entire beat. In other embodiments, the critical word may be included in the beat, and the beat may include additional data as well.

The critical word may be one or more bytes of data that the source of a given read memory operation is awaiting. For example, a processor may execute a load instruction which accesses a word within a cache block, and the critical word may be the word accessed by the load. For example, the word may be the data from within the block that is to be written to a target of the load instruction, such as a processor register. The processor may be stalled on the load instruction, awaiting the critical word to complete the load. Other instructions, particularly instructions that depend on the load instruction, may also be stalled. Other sources may also be awaiting a particular word within a block. In general, the offset bits of the address (i.e. those least significant bits which identify bytes within the block) may be used to identify the critical word.

Additionally, in an embodiment, the memory controller 40 may be configured to return multiple critical words prior to returning the remaining data of the blocks that include the critical words. In some embodiments, each beat of remaining data may be individually scheduled for transmission on the port, and critical words of other blocks may be scheduled ahead of remaining beats for transmission. In an embodiment, if multiple critical words are ready to be forwarded concurrently, the QoS parameters associated with the read memory operations may be used to select between the critical words. In some embodiments, the memory controller 40 may be configured to transmit a critical word beat even if the remaining beats are not yet ready to transfer for the same memory operation. Generally, the ports 44A-44E may be independent of each other. Accordingly, critical word forwarding may proceed on each port independent of the other ports.

In one embodiment, each port 44A-44E may be associated with a particular type of traffic. For example, in one embodiment, the traffic types may include RT traffic, NRT traffic, and graphics traffic. Other embodiments may include other traffic types in addition to, instead of, or in addition to a subset of the above traffic types. Each type of traffic may be characterized differently (e.g. in terms of requirements and behavior), and the memory controller may handle the traffic types differently to provide higher performance based on the characteristics. For example, RT traffic requires servicing of each memory operation within a specific amount of time. If the latency of the operation exceeds the specific amount of time, erroneous operation may occur in the RT peripheral. For example, image data may be lost or a displayed image may visually distort. RT traffic may be characterized as isochronous, for example. On the other hand, graphics traffic may be relatively high bandwidth, but is not latency-sensitive. NRT traffic, such as from the processors 16, is more latency-sensitive for performance reasons but survives higher latency. That is, NRT traffic may generally be serviced at any latency without causing erroneous operation in the devices generating the NRT traffic. Similarly, the less latency-sensitive but higher bandwidth graphics traffic may be generally serviced at any latency. Other NRT traffic may include audio traffic, which is relatively low bandwidth and generally may be serviced with reasonable latency. Most peripheral traffic may also be NRT (e.g. traffic to storage devices such as magnetic, optical, or solid state storage). By providing ports 44A-44E associated with different traffic types, the memory controller 40 may be exposed to the different traffic types in parallel, and may thus be capable of making better decisions about which memory operations to service prior to others based on traffic type.

Each port 44A-44E is coupled to an interface to communicate with its respective agent. The interface may be any type of communication medium (e.g. a bus, a point-to-point interconnect, etc.) and may implement any protocol. In some embodiments, the ports 44A-44E may all implement the same interface and protocol. In other embodiments, different ports may implement different interfaces and/or protocols. An interface may refer to the signal definitions and electrical properties of the interface, and the protocol may be the logical definition of communications on the interface (e.g. including commands, ordering rules, coherence support if any, etc.).

In an embodiment, each source may assign a quality of service (QoS) parameter to each memory operation transmitted by that source. The QoS parameter may identify a requested level of service for the memory operation. Memory operations with QoS parameter values requesting higher levels of service may be given preference over memory operations requesting lower levels of service. Specifically, in an example, each memory operation may include a command, a flow identifier (FID), and a QoS parameter (QoS). The command may identify the memory operation (e.g. read or write). A read command/memory operation causes a transfer of data from the memory 12A-12B to the source, whereas a write command/memory operation causes a transfer of data from the source to the memory 12A-12B. Commands may also include commands to program the memory controller 40. The FID may identify a memory operation as being part of a flow of memory operations. A flow of memory operations may generally be related, whereas memory operations from different flows, even if from the same source, may not be related. A portion of the FID (e.g. a source field) may identify the source, and the remainder of the FID may identify the flow (e.g. a flow field). Thus, an FID may be similar to a transaction ID, and some sources may simply transmit a transaction ID as an FID. In such a case, the source field of the transaction ID may be the source field of the FID and the sequence number (that identifies the transaction among transactions from the same source) of the transaction ID may be the flow field of the FID. Sources that group transactions as a flow, however, may use the FIDs differently. Alternatively, flows may be correlated to the source field (e.g. operations from the same source may be part of the same flow and operations from a different source are part of a different flow). The ability to identify transactions of a flow may be used in a variety of ways described below (e.g. QoS upgrading, reordering, etc.).

Thus, a given source may be configured to use QoS parameters to identify which memory operations are more important to the source (and thus should be serviced prior to other memory operations from the same source), especially for sources that support out-of-order data transmissions with respect to the address transmissions from the source. Furthermore, the QoS parameters may permit sources to request higher levels of service than other sources on the same port and/or sources on other ports.

The memory controller 40 may be configured to process the QoS parameters received on each port 44A-44E and may use the relative QoS parameter values to schedule memory operations received on the ports with respect to other memory operations from that port and with respect to other memory operations received on other ports. More specifically, the memory controller 40 may be configured to compare QoS parameters that are drawn from different sets of QoS parameters (e.g. RT QoS parameters and NRT QoS parameters) and may be configured to make scheduling decisions based on the QoS parameters.

In some embodiments, the memory controller 40 may be configured to upgrade QoS levels for pending memory operations. Various upgrade mechanism may be supported. For example, the memory controller 40 may be configured to upgrade the QoS level for pending memory operations of a flow responsive to receiving another memory operation from the same flow that has a QoS parameter specifying a higher QoS level. This form of QoS upgrade may be referred to as in-band upgrade, since the QoS parameters transmitted using the normal memory operation transmission method also serve as an implicit upgrade request for memory operations in the same flow. The memory controller 40 may be configured to push pending memory operations from the same port or source, but not the same flow, as a newly received memory operation specifying a higher QoS level. As another example, the memory controller 40 may be configured to couple to a sideband interface from one or more agents, and may upgrade QoS levels responsive to receiving an upgrade request on the sideband interface. In another example, the memory controller 40 may be configured to track the relative age of the pending memory operations. The memory controller 40 may be configured to upgrade the QoS level of aged memory operations at certain ages. The ages at which upgrade occurs may depend on the current QoS parameter of the aged memory operation.

The memory controller 40 may be configured to use the QoS parameters of the memory operations mapped to the same channel to determine an order of memory operations transmitted into the channel. That is, the memory controller 40 may reorder the memory operations from their original order of receipt on the ports. Additionally, during processing in the channel, the memory operations may be reordered again at one or more points. At each level of reordering, the amount of emphasis placed on the QoS parameters may decrease and factors that affect memory bandwidth efficiency may increase. Once the memory operations reach the end of the memory channel pipeline, the operations may have been ordered by a combination of QoS levels and memory bandwidth efficiency. High performance may be realized in some embodiments.

The processors 16 may implement any instruction set architecture, and may be configured to execute instructions defined in that instruction set architecture. The processors 16 may employ any microarchitecture, including scalar, superscalar, pipelined, superpipelined, out of order, in order, speculative, non-speculative, etc., or combinations thereof. The processors 16 may include circuitry, and optionally may implement microcoding techniques. The processors 16 may include one or more level 1 caches, and thus the cache 18 is an L2 cache. Other embodiments may include multiple levels of caches in the processors 16, and the cache 18 may be the next level down in the hierarchy. The cache 18 may employ any size and any configuration (set associative, direct mapped, etc.). In the case of critical word forwarding, each processor may have read operations outstanding to the memory controller 40. By forwarding multiple critical words prior to forwarding the remaining beats of blocks, the memory controller 40 may rapidly provide the critical words that each processor is awaiting. In an embodiment, different processors generate different FIDs, and thus no ordering dependency may be detected between read memory operations from different processors.

The CPU block 14 may be an example of a processor unit. Generally, a processor unit may include at least one processor and may include multiple processors. The processor unit may communicate on an interface to the memory controller 40 as a unit (that is, the memory operations from the processors in the processor unit may be arbitrated within the processor unit and winning operations may be presented on the interface). The processor unit may also include various other circuitry such as the L2 cache described above.

The graphics controllers 38A-38B may be any graphics processing circuitry. Generally, the graphics controllers 38A-38B may be configured to render objects to be displayed into a frame buffer. The graphics controllers 38A-38B may include graphics processors that may execute graphics software to perform a part or all of the graphics operation, and/or hardware acceleration of certain graphics operations. The amount of hardware acceleration and software implementation may vary from embodiment to embodiment.

The NRT peripherals 20 may include any non-real time peripherals that, for performance and/or bandwidth reasons, are provided independent access to the memory 12A-12B. That is, access by the NRT peripherals 20 is independent of the CPU block 14, and may proceed in parallel with CPU block memory operations. Other peripherals such as the peripherals 32A-32C and/or peripherals coupled to a peripheral interface controlled by the peripheral interface controller 34 may also be non-real time peripherals, but may not require independent access to memory. Various embodiments of the NRT peripherals 20 may include video encoders and decoders, scaler circuitry and image compression and/or decompression circuitry, etc.

The RT peripherals 22 may include any peripherals that have real time requirements for memory latency. For example, the RT peripherals may include an image processor and one or more display pipes. The display pipes may include circuitry to fetch one or more frames and to blend the frames to create a display image. The display pipes may further include one or more video pipelines. The result of the display pipes may be a stream of pixels to be displayed on the display screen. The pixel values may be transmitted to a display controller for display on the display screen. The image processor may receive camera data and process the data to an image to be stored in memory.

The bridge/DMA controller 30 may comprise circuitry to bridge the peripheral(s) 32 and the peripheral interface controller(s) 34 to the memory space. In the illustrated embodiment, the bridge/DMA controller 30 may bridge the memory operations from the peripherals/peripheral interface controllers through the CPU block 14 to the memory controller 40. The CPU block 14 may also maintain coherence between the bridged memory operations and memory operations from the processors 16/L2 Cache 18. The L2 cache 18 may also arbitrate the bridged memory operations with memory operations from the processors 16 to be transmitted on the CPU interface to the CPU port 44C. The bridge/DMA controller 30 may also provide DMA operation on behalf of the peripherals 32 and the peripheral interface controllers 34 to transfer blocks of data to and from memory. More particularly, the DMA controller may be configured to perform transfers to and from the memory 12A-12B through the memory controller 40 on behalf of the peripherals 32 and the peripheral interface controllers 34. The DMA controller may be programmable by the processors 16 to perform the DMA operations. For example, the DMA controller may be programmable via descriptors. The descriptors may be data structures stored in the memory 12A-12B that describe DMA transfers (e.g. source and destination addresses, size, etc.). Alternatively, the DMA controller may be programmable via registers in the DMA controller (not shown).

The peripherals 32A-32C may include any desired input/output devices or other hardware devices that are included on the integrated circuit 10. For example, the peripherals 32A-32C may include networking peripherals such as one or more networking media access controllers (MAC) such as an Ethernet MAC or a wireless fidelity (WiFi) controller. An audio unit including various audio processing devices may be included in the peripherals 32A-32C. One or more digital signal processors may be included in the peripherals 32A-32C. The peripherals 32A-32C may include any other desired functional such as timers, an on-chip secrets memory, an encryption engine, etc., or any combination thereof.

The peripheral interface controllers 34 may include any controllers for any type of peripheral interface. For example, the peripheral interface controllers may include various interface controllers such as a universal serial bus (USB) controller, a peripheral component interconnect express (PCIe) controller, a flash memory interface, general purpose input/output (I/O) pins, etc.

The memories 12A-12B may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with the integrated circuit 10 in a chip-on-chip configuration, a package-on-package configuration, or a multi-chip module configuration.

The memory PHYs 42A-42B may handle the low-level physical interface to the memory 12A-12B. For example, the memory PHYs 42A-42B may be responsible for the timing of the signals, for proper clocking to synchronous DRAM memory, etc. In one embodiment, the memory PHYs 42A-42B may be configured to lock to a clock supplied within the integrated circuit 10 and may be configured to generate a clock used by the memory 12.

It is noted that other embodiments may include other combinations of components, including subsets or supersets of the components shown in FIG. 1 and/or other components. While one instance of a given component may be shown in FIG. 1, other embodiments may include one or more instances of the given component. Similarly, throughout this detailed description, one or more instances of a given component may be included even if only one is shown, and/or embodiments that include only one instance may be used even if multiple instances are shown.

It is noted that, while a memory controller having multiple ports is shown in this embodiment, other embodiments may be a single-ported memory controller coupled to, e.g., a shared bus to the various memory operation sources.

The definition of QoS levels may vary from embodiment to embodiment. For example, an embodiment of the RT QoS levels may include a real time green (RTG) QoS level as the lowest priority RT QoS level; a real time yellow (RTY) QoS level as the medium priority RT QoS level; and a real time red (RTR) QoS level as the highest priority RT QoS level. An embodiment of the NRT QoS levels may include a best effort (BEF) QoS level as the lowest priority NRT QoS level and the low latency (LLT) QoS level as the highest priority NRT QoS level.

The RTG, RTY, and RTR QoS levels may reflect relative levels of urgency from an RT source. That is, as the amount of time before data is needed by the RT source to prevent erroneous operation decreases, the QoS level assigned to each memory operation increases to indicate the higher urgency. By treating operations having higher urgency with higher priority, the memory controller 40 may return data to the RT source more quickly and may thus aid the correct operation of the RT source.

The BEF NRT QoS level may be a request to return the data as quickly as the memory controller 40 is able, once the needs of other flows of data are met. On the other hand, the LLT NRT QoS level may be a request for low latency data. NRT memory operations having the LLT QoS level may be treated more closely, in terms of priority with other memory transactions, than those having the BEF QoS level (at least in some cases). In other cases, the BEF and LLT QoS levels may be treated the same by the memory controller 40.

Figure 2:
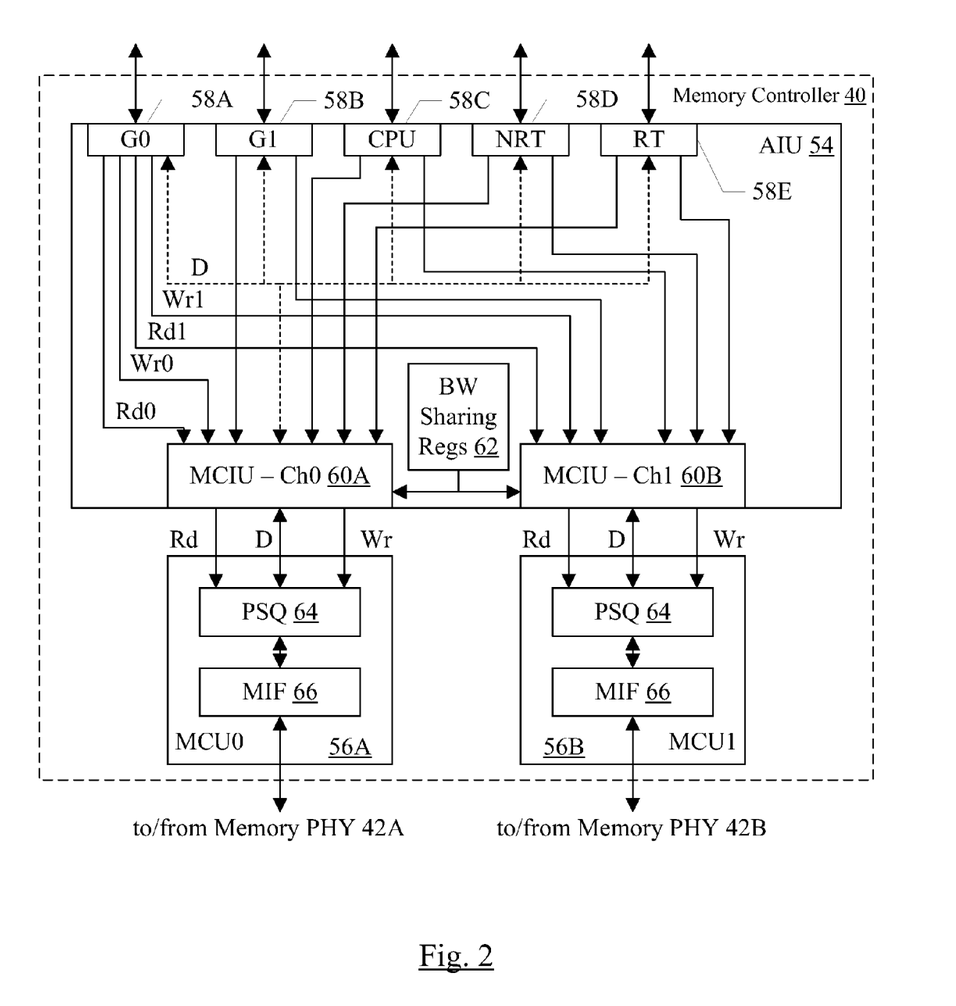
FIG. 2 is a block diagram of one embodiment of the memory controller shown in FIG. 1.

Turning next to FIG. 2, a block diagram of one embodiment of the memory controller 40 is shown. In the embodiment of FIG. 2, the memory controller 40 includes an agent interface unit (AIU) 54 and one or more memory channel units 56A-56B. There may be one memory channel unit 56A-56B for each memory channel included in a given embodiment, and other embodiments may include one channel or more than two channels. As illustrated in FIG. 2, the AIU 54 may include multiple port interface units 58A-58E. More particularly, there may be a port interface unit 58A-58E for each port 44A-44E on the memory controller 40. The AIU 54 may further include memory channel interface units (MCIUs) 60A-60B (one for each memory channel unit 56A-56B). The AIU 54 may further include one or more bandwidth sharing registers 62, which may be programmable to indicate how bandwidth is to be shared among the ports. The port interface units 58A-58E may be coupled to receive memory operations and to receive/transmit data and responses on the corresponding port, and may also be coupled to the MCIUs 60A-60B. The MCIUs 60A-60B may further be coupled to the bandwidth sharing registers 62 and to the corresponding MCU 56A-56B. As illustrated in FIG. 2, the MCUs 56A-56B may each include a presorting queue (PSQ) 64 and a memory interface circuit (MIF) 66. The PSQs 64 are coupled to the corresponding MCIUs 60A-60B and to the MIF 66 in the same MCU 56A-56B. The MIF 66 in each MCU 56A-56B is coupled to the corresponding memory PHY 42A-42B.

The AIU 54 may be configured to receive memory operations on the ports 44A-44E and to switch the memory operations to the channels addressed by those memory operations, using the QoS parameters of the memory operations as a factor in deciding which memory operations to transmit to one of the MCUs 56A-56B prior to other memory operations to the same MCU 56A-56B. Other factors may include the bandwidth sharing controls to divide bandwidth on the memory channels among the ports. The determination of which MCU 56A-56B is to receive a memory operation may depend on the address of the operation and the generation of channel selects from the address, as described in more detail below.

More particularly, each port interface unit 58A-58E may be configured to receive the memory operations from the corresponding port 44A-44E, and may be configured to determine the memory channel to which a given memory operation is directed. The port interface unit 58A-58E may transmit the memory operation to the corresponding MCIU 60A-60B, and may transmit reads separately from writes in the illustrated embodiment. Thus, for example, the port interface unit 58A may have a Rd0 connection and a Wr0 connection to the MCIU 60A for read operations and write operations, respectively. Similarly, the port interface unit 58A may have a Rd1 and a Wr1 connection to the MCIU 60B. The other port interface units 58B-58E may have similar connections to the MCIU 60A-60B. There may also be a data interface to transmit read data from the port interface units 58A-58B to the MCIUs 60A-60B, illustrated generally as the dotted "D" interface for the MCIU 60A in FIG. 3.

The MCIUs 60A-60B may be configured to queue the memory operations provided by the port interface units 58A-58E, and to arbitrate among the memory operations to select operations to transmit to the corresponding MCUs 56A-56B. The arbitration among operations targeted at a given memory channel may be independent of the arbitration among operations targeted at other memory channels.

The MCIUs 60A-60B may be coupled to the bandwidth sharing registers 62, which may be programmed to indicate how memory bandwidth on a channel is to be allocated to memory operations in the given channel. For example, in one embodiment, the MCIUs 60A-60B may use a deficit-weighted round-robin algorithm to select among the ports when the is no high priority traffic present (e.g. RTR or RTY QoS levels in the RT traffic). When RTR or RTY traffic is present, a round-robin mechanism may be used to select among the ports that have RTR/RTY traffic. The weights in the deficit weighted round-robin mechanism may be programmable to allocated relatively more bandwidth to one port than another. The weights may be selected to favor processor traffic over the graphics and NRT ports, for example, or to favor the graphics ports over other ports. Any set of weights may be used in various embodiments. Other embodiments may measure the bandwidth allocations in other ways. For example, percentages of the total bandwidth may be used. In other embodiments, a credit system may be used to control the relative number of operations from each port that are selected. Generally, however, operations may be selected based on both QoS parameters and on bandwidth sharing requirements in various embodiments.

The MCUs 56A-56B are configured to schedule memory operations from their queues to be transmitted on the memory channel. The MCUs may be configured to queue reads and writes separately in the PSQs 64, and may be configured to arbitrate between reads and writes using a credit based system, for example. In the credit-based system, reads and writes are allocated a certain number of credits. The number of write credits and read credits need not be equal. Each scheduled memory operation may consume a credit. Once both the write credits and the read credits are reduced to zero or less and there is a pending transaction to be scheduled, both credit may be increased by the corresponding allocated number of credits. Other embodiments may use other mechanisms to select between reads and writes. In one embodiment, the credit system may be part of the arbitration mechanism between reads and writes (along with measurements of the fullness of the write queue). That is, as the write queue becomes more full, the priority of the writes in the arbitration mechanism may increase.

In one embodiment, the QoS parameters of the write operations may be eliminated on entry into the PSQs 64. The read operations may retain the QoS parameters, and the QoS parameters may affect the read scheduling from the PSQs 64.

In an embodiment, the MCUs 56A-56B may schedule memory operations in bursts of operations (each operation in the burst consuming a credit). If the burst reduces the credit count to zero, the burst may be permitted to complete and may reduce the credit count to a negative number. When the credit counts are increased later, the negative credits may be accounted for, and thus the total number of credits after increase may be less than the allocated credit amount.

To create bursts of memory operations for scheduling, the MCUs 56A-56B may be configured to group memory operations into affinity groups. A memory operation may be said to exhibit affinity with another memory operation (or may be said to be affine to the other memory operation) if the operations may be performed efficiently on the memory interface when performed in close proximity in time. Efficiency may be measured in terms of increased bandwidth utilization. For example, SDRAM memories are characterized by a page that can be opened using an activate command (along with an address of the page). The size of the page may vary from embodiment to embodiment, and generally may refer to a number of contiguous bits that may be available for access once the activate command has been transmitted. Asynchronous DRAM memories may similarly have a page that may be opened by asserting a row address strobe control signal and by providing the row address. Two or more memory operations that access data in the same page may be affine, because only one activate/RAS may be needed on the interface for the memory operations. SDRAM memories also have independent banks and ranks A bank may be a collection of memory cells within an SDRAM chip that may have an open row (within which page hits may be detected). A rank may be selected via a chip select from the memory controller, and may include one or more SDRAM chips. Memory operations to different ranks or banks may also be affine operations, because they do not conflict and thus do not require the page to be closed and a new page to be opened. Memory operations may be viewed as affine operations only if they transfer data in the same direction (i.e. read operations may only be affine to other read operations, and similarly write operations may only be affine other write operations). Memory operations to the same page (or to an open page) may be referred to as page hits, and memory operations to different banks/ranks may be referred to as bank hits and rank hits, respectively.

The MCUs 56A-56B may also be configured to schedule commands on the memory interface to the memories 12A-12B (through the memory PHYs 42A-42B) to perform the scheduled memory operations. More particularly, in an embodiment, the MCUs 56A-56B may be configured to presynthesize the commands for each memory operation and to enqueue the commands. The MCUs 56A-56B may be configured schedule the commands to provide efficient use of the memory bandwidth. The MIFs 66 in each MCU 56A-56B may implement the presynthesis of commands and the scheduling of the commands, in an embodiment.

Critical Word Forwarding in the Memory Controller

Figure 3:
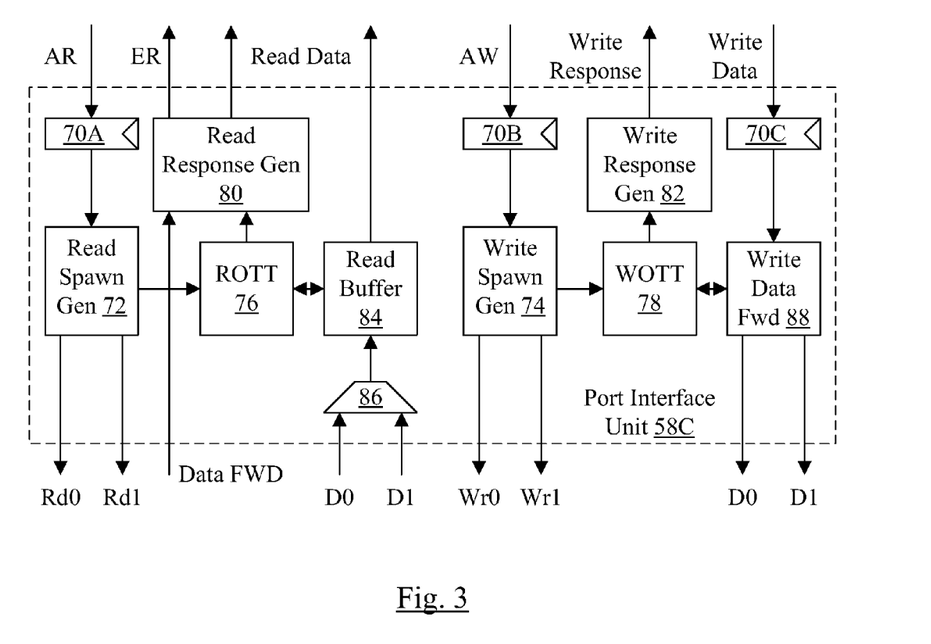
FIG. 3 is a block diagram of one embodiment of a port interface unit that may be included in one embodiment of an agent interface unit shown in FIG. 2.

Turning now to FIG. 3, a block diagram of one embodiment of the port interface unit 58C is shown. Other port interface circuits 58A-58B and 58D-58E may be similar, although there may be differences in implementation for port interface circuits that couple to different interfaces. In the illustrated embodiment, the port interface unit 58C includes buffers 70A-70B coupled to read (AR) and write (AW) interfaces to receive read and write memory operations, respectively, as illustrated in FIG. 3. The buffers 70A-70B are coupled to a read spawn generator 72 and a write spawn generator 74, respectively, which are coupled to the Rd0/Rd1 interfaces and the Wr0/Wr1 interfaces, respectively. The read spawn generator 72 is coupled to a read outstanding transaction table (ROTT) 76, and the write spawn generator 74 is coupled to a write outstanding transaction table (WOTT) 78. The ROTT 76 is coupled to a read response generator 80 which is configured to generate a read response on the interface. The ROTT is also coupled to a read buffer 84, which is coupled to receive data from either MCU 56A-56B through a mux 86 and to provide read data on the interface. The WOTT 78 is coupled to a write response generator 82 which is configured to generate a write response on the interface. The WOTT 78 is also coupled to a write data forward buffer 88, which is coupled to provide data to the MCUs 56A-56B and is coupled to receive data from a buffer 70C, which is coupled to receive write data from the interface. The read response generator is also coupled to receive data forward signaling from the MCUs 56A-56B, in this embodiment.

For a read operation, the buffer 70A may be configured to receive the operation from the interface. The buffer 70A may be provided to capture the read operation and hold it for processing by the read spawn generator 72. In an embodiment, the buffer 70A may be a two entry "skid" buffer that permits a second operation to be captured in the event of delay for an unavailable resource to become available, for example, thus easing timing on propagating back pressure requests to the source(s) on the interface. The buffers 70B-70C may similarly be two entry skid buffers. Other embodiments may include additional entries in the skid buffers, as desired.

The read spawn generator 72 may be configured to decode the address of the read operation to determine which memory channel is addressed by the read operation. The read spawn generator 72 may be configured to transmit the read operation to the addressed memory channel via the Rd0 or Rd1 interface. In some embodiments, a read operation may overlap memory channels. Each read operation may specify a size (i.e. a number of bytes to be read beginning at the address of the operation). If the combination of the size and the address indicates that bytes are read from more than one channel, the read spawn generator 72 may be configured to generate multiple read operations to the addressed channels. The read data from the multiple read operations may be accumulated in the read buffer 84 to be returned to the source.

The read spawn generator 72 may also be configured to update the ROTT 76, allocating an entry in the ROTT 76 to track the progress of the read. Once the data has been received in the read buffer 84, the read response generator 80 may be configured to generate a read response to transfer the data to the source. If read data is to be returned in order on the interface (e.g. according to the protocol on the interface) or is to be returned in order with selected previous operations (e.g. operations from the same source, as determined via the FID), the data may remain buffered in the read buffer 84 until previous reads have been returned and then the read response generator 80 may be configured transfer the data. The ROTT 76 may be coupled to receive various status signals from the MCUs 56A-56B to update the status of the pending read operations (not shown in FIG. 3).

More particularly, the read response generator 80 may be configured to schedule critical word forwarding for the various read memory operations in the ROTT 76. If there are no critical word beats available for forwarding, the read response generator 80 may be configured to schedule remaining beats to be transmitted. A critical word beat may be available for forwarding if the data is ready to be forwarded and the corresponding read memory operation is not blocked by a dependency on another memory operation. The data may be ready for forwarding if the data is stored in the read buffer 84. More particularly, the critical word beat data may be ready for forwarding independent of whether or not the remaining data of the block is ready for forwarding. Accordingly, the critical word beat may be transmitted before the remaining beats have been received in the read buffer 84. In some embodiments, the data may also be ready for forwarding if the ROTT 76 has received signaling that the data is being transmitted to the read buffer 84 and the data will be available in the buffer or for forwarding when the data is needed for transmission on the interface. The dependency on another memory operation may be an ordering dependency, for example, as discussed above.

Data transmitted on interface may include the beat of data, and may also include the FID of the read memory operation corresponding to the beat of data. The source of the memory operation may match the FID and may capture the transmitted data. In an embodiment, the read response generator 80 may not generate any indication of which beat of data is being transmitted. The source may track the return of beats for each outstanding read memory operation and may thus be aware of which beat is provided. The order of the beats may be fixed (other than the critical word beat, which may be any beat of the block), or the order may be specified in each read memory operation and the read response generator 80 may be configured to return the beats in the specified order.

In the illustrated embodiment, the read response generator 80 may also be configured to generate an early response on an early response interface to the CPU block 14. The MCUs 56A-56B may signal that data will be forwarded in a known number of clock cycles, and the read response generator 80 may determine if the data is a critical word and may transmit an early response on the early response interface if the data is a critical word beat. The early response may include the FID of the memory operation, and may be used by the CPU block 14 to prepare the forwarding paths for the critical word to forward the critical word to the corresponding processor without delay. Additional details for one embodiment are provided below.

The buffer 70B, the write spawn generator 74, and the WOTT 78 may operate similarly for write operations. However, data is received rather than transmitted on the interface. The write data may be received in the write data forward buffer 88, and may be forwarded to the current location of the corresponding write operation. The WOTT 78 may signal for the write response once the write has been guaranteed to complete, terminating the writes on the interface with a write response earlier than might otherwise be possible.

It is noted that, while the embodiment illustrated in FIG. 3 includes an interface that conveys read and write memory operations separately (AR and AW, respectively), other embodiments may include a single transmission medium for both read and write operations. In such and embodiment, a single buffer 70 may receive the operations, and the read spawn generator 72 and the write spawn generator 74 may decode the command from the interface to differentiate read and write operations. Alternatively, there may be one spawn generator which generates both read and write operations and updates the ROTT 74 or the WOTT 78 accordingly.

Figure 4:
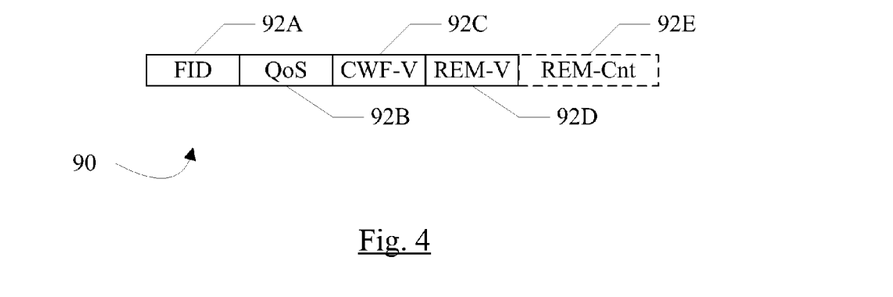
FIG. 4 is a block diagram of one embodiment of a read outstanding transaction table (ROTT) entry.

FIG. 4 is a block diagram of a portion of one embodiment of a ROTT table entry 90. Other entries may be similar. Generally, the ROTT table 76 may include any type of memory (e.g. a random access memory (RAM), content addressable memory (CAM), combination of CAM and RAM, registers, etc.).

In the illustrated embodiment, the entry 90 may include an FID field 92A, a QoS field 92B, a critical word forward valid (CWF-V) field 92C, a remaining data valid (REM-V) field 92D, and optionally a remaining data count (REM-Cnt) field 92E. The FID field 92A stores the FID of the memory operation, to be returned on the interface with each beat of read data. The QoS field 92B stores the QoS parameter of the memory operation. In embodiments which upgrade the QoS parameters, as described above, the ROTT 76 may be configured to update the QoS parameter in response to an upgrade. The CWF-V field 92C may store an indicator of whether or not the beat of data that includes the critical word has been provided to the read buffer 84 (that is, whether or not the beat is valid). The indicator may be a bit, for example, that indicates when set that the critical word beat has been provided and indicative, when clear, that the critical word beat has not yet been provided. Other embodiments may use the opposite meaning of the set and clear states, or multibit indicators. The REM-V field 92D may similarly store an indicator of whether or not the remaining beats are valid. The REM-V field 92D may store a bit, similar to the CWF-V field 92C. Alternatively, the REM-V field may store a bit vector with a bit for each remaining beat and the bit may be set to indicate that the corresponding remaining beat is valid and clear to indicate invalid. In another alternative, the REM-V field may store a count of remaining beats that have been provided. The REM-Cnt field 92E may be used in embodiment in which each remaining beat is individually scheduled (to permit additional critical word forwarding in between remaining beats of a given block). The REM-Cnt field 92E may be a count of transmitted beats (or may alternatively be a count of beats awaiting transmittal). Alternatively, the REM-Cnt field 92E may be a bit vector with a bit for each remaining beat, indicating whether or not the beat has been transmitted.

Figure 5:
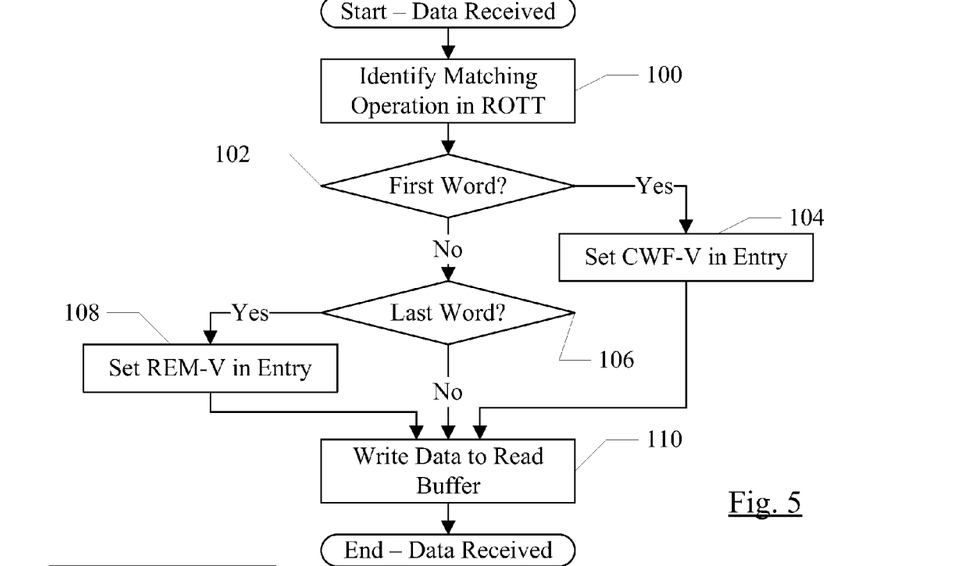
FIG. 5 is a flowchart illustrating operation of one embodiment of the port interface unit in response to data being provided by a memory channel unit.

Turning now to FIG. 5, a flowchart is shown illustrating operation of one embodiment of the port interface unit 52C to update the ROTT table 76 in response to data being provided to the read buffer 84. While the blocks are shown in a particular order for ease of understanding, other orders may be used. Blocks may be performed in parallel in combinatorial logic in the port interface unit 52C. Blocks, combinations of blocks, and/or the flowchart as a whole may be pipelined over multiple clock cycles. The port interface unit 52C may be configured to implement the operation shown in FIG. 5. Other port interface units may be similar.

The port interface unit 52C may be configured to identify the matching operation in the ROTT 76 (block 100). For example, the MCU 56A-56B that is providing the data may return the FID of the operation for comparison to the FID field 92A in each entry 90. Alternatively, an entry number identifying the entry in the ROTT 76 may be pipelined to the MCU 56A-56B with the memory operation and may be returned with each beat of data to be written to the read buffer 84. If the CWF-V bit is not set, the returning beat is the critical word beat (decision block 102, "yes" leg), and the port interface unit 52C may be configured to set the CWF-V bit in the entry (block 104). Otherwise, if the beat is the last beat of data (decision block 106, "yes" leg), the port interface unit 52C may be configured to set the REM-V bit (block 108). The port interface unit 52C may also be configured to write the data to the read buffer 84 (block 110).

In embodiments that support scheduling of individual remaining beats, the port interface unit 52C may be configured to update the REM-V field for each beat after the initial beat (not only the last beat). For example, a bit in the REM-V bit vector may be set. If the REM-V field is a counter, the field may be incremented or decremented for each beat depending on how the beats are counted for the REM-V field.

Figure 6:
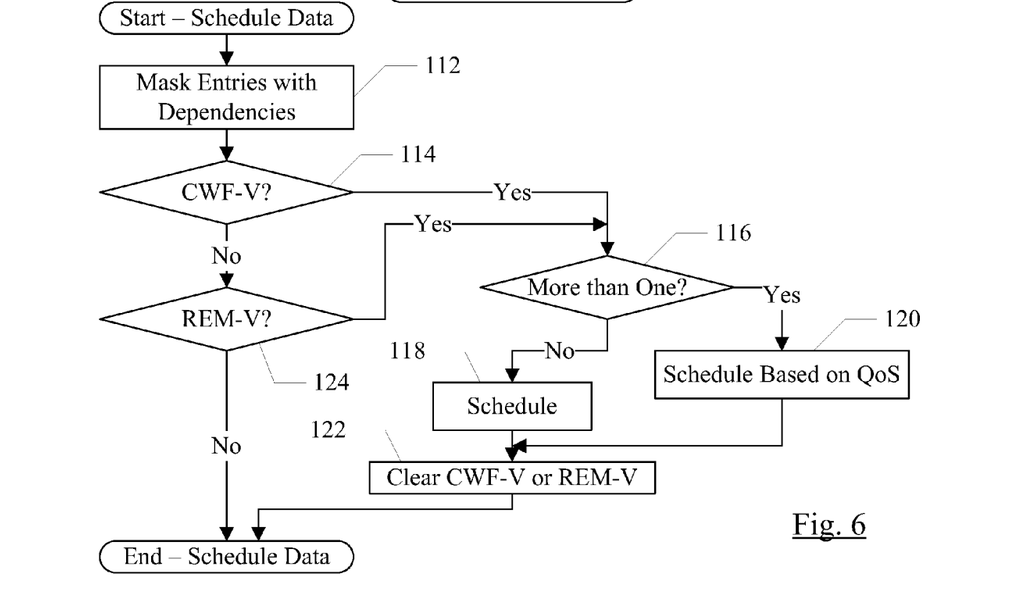
FIG. 6 is a flowchart illustrating operation of one embodiment of the port interface unit to schedule data for transmission on a data interconnect of the port.

Turning now to FIG. 6, a flowchart is shown illustrating operation of one embodiment of the read response generator 80 to schedule data for transmission on the interface to the CPU block 14. While the blocks are shown in a particular order for ease of understanding, other orders may be used. Blocks may be performed in parallel in combinatorial logic in the read response generator 80. Blocks, combinations of blocks, and/or the flowchart as a whole may be pipelined over multiple clock cycles. The read response generator 80 may be configured to implement the operation shown in FIG. 6. FIG. 6 illustrates an evaluation of the state of the ROTT 76 that may be performed by the read response generator 80 to schedule a beat of data for transmission. Thus, the read response generator 80 may be configured to reevaluate the state according to the flowchart each clock cycle.

The read response generator 80 may be configured to mask entries in the ROTT 76 that have dependencies on other entries, since these entries are ineligible for scheduling (block 112). The dependencies may be tracked in the ROTT entries themselves (not shown in the entry 90 of FIG. 4), or may be determined by comparing FIDs of operations in the ROTT 76.

The read response generator 80 may be configured to scan the entries that are not masked for CWF-V bits that are set. If at least one entry has a set CWF-V bit (decision block 114, "yes" leg), and only one such entry is identified (decision block 116, "no" leg), the read response generator 80 may be configured to schedule the entry to forward its critical word (block 118). On the other hand, if more than one entry has it's CWF-V bit set (decision block 116, "yes" leg), the read response generator 80 may be configured to select one of the entries based on other criteria (block 120). In this embodiment, the read response generator 80 may be configured to schedule based on the QoS of the memory operations. That is, the read response generator 80 may be configured to schedule the memory operation having the highest QoS, as indicated by the QoS parameter, indicating the greatest urgency. For example, in an embodiment, the RTR QoS level may be scheduled first; followed by the RTY QoS level. The RTG, BEF, and LLT QoS levels may be treated equally and below the RTR and RTY QoS levels. If two or more entries having matching QoS levels (in terms of priority), an oldest entry of the entries having matching QoS levels may be scheduled. Other embodiments may use other criteria. For example, the oldest entry 90 may be selected. That is, the entry 90 that has been storing information related to a given read memory operation for the longest period of time may the oldest entry. In either case, the CWF-V bit in the selected entry may be cleared in response to scheduling the critical word (block 122).

It is noted that the CWF-V field is considered and a critical word beat is scheduled for transmission without regard to the remaining beats in the embodiment of FIG. 6. Accordingly, forwarding of the critical word is independent of having received the remaining words of a block and may be performed prior to receiving the remaining words of the block. Additionally, in this embodiment, a critical word having a lower QoS level may be forwarded prior to a remaining beat having a higher QoS level.

If the CWF-V is not set in any entry that is not masked (decision block 114, "no" leg), an entry having remaining data beats to be transmitted may be selected (decision block 124). If an entry having remaining data beats is identified (decision block 124, "yes" leg), the entry may be scheduled (or QoS may be used to select among multiple identified entries, as described above—blocks 116, 118, and 120). Alternatively, age or other criteria may be used. In an embodiment, age may be used as a criteria for the remaining data beats and QoS may be used for critical word forwarding determinations. In various embodiments, the criteria used to select among multiple critical word forwardings may be the same as the criteria used to select among multiple remaining beats, or may be different criteria. In either case, the REM-V bit in the selected entry may be cleared in response to scheduling the remaining beats (block 122). That is, this embodiment may scheduling the remaining beats of a given block as a unit, and the remaining beats may be transmitted as a unit even though there are multiple beats.

Figure 7:
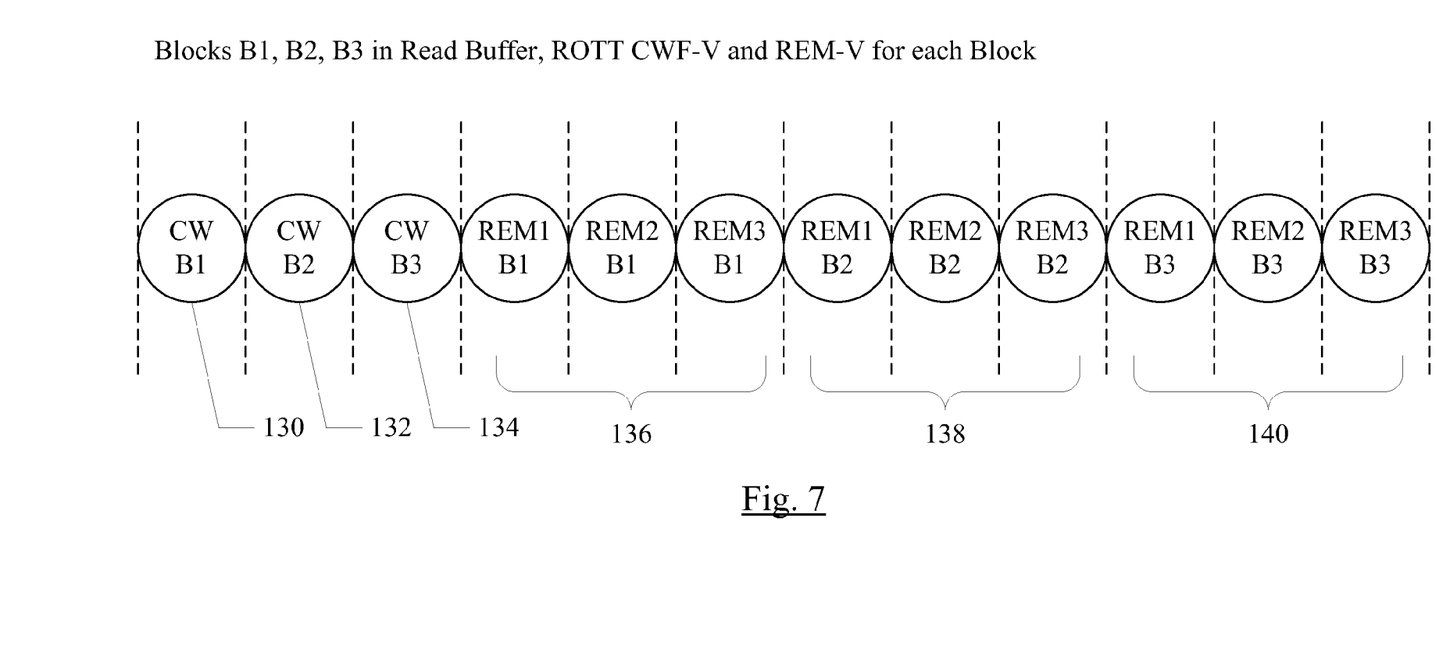
FIG. 7 is a timing diagram illustrating an example of the data transmission for several blocks.

FIG. 7 is a timing diagram illustrating operation of one embodiment of the port interface unit 58C for an example group of blocks. At the beginning of the timing diagram, blocks B1, B2, and B3 may be stored in the read buffer 84 and the ROTT 76 may have the CWF-V and REM-V bits set for the entries in the ROTT 76 that correspond to blocks B1 to B3.

The read response generator 80 may detect a CWF-V in three successive scheduling attempts, and thus may schedule the critical word beats for each of blocks B1-B3 for transmission (reference numerals 130, 132, and 134). Subsequently the remaining beats of each block may be scheduled as a unit (reference numerals 136, 138, and 140).

Figure 8:
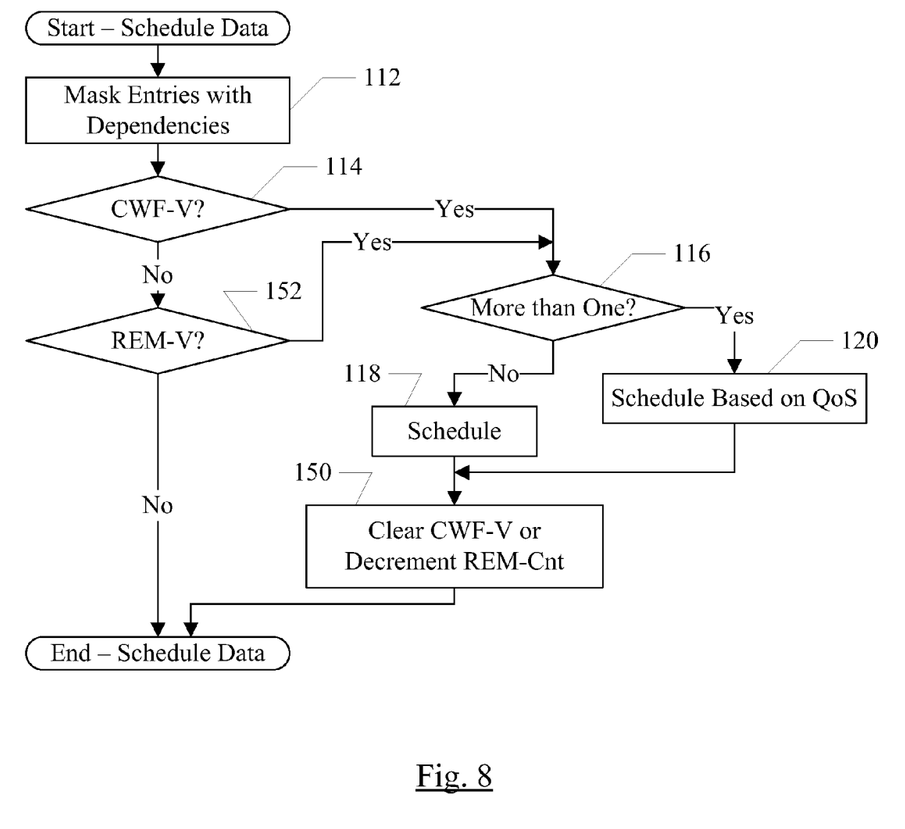
FIG. 8 is a flowchart illustrating operation of another embodiment of the port interface unit to schedule data for transmission on a data interconnect of the port.

Turning now to FIG. 8, a flowchart is shown illustrating operation of another embodiment of the read response generator 80 to schedule data for transmission on the interface to the CPU block 14. While the blocks are shown in a particular order for ease of understanding, other orders may be used. Blocks may be performed in parallel in combinatorial logic in the read response generator 80. Blocks, combinations of blocks, and/or the flowchart as a whole may be pipelined over multiple clock cycles. The read response generator 80 may be configured to implement the operation shown in FIG. 8. FIG. 8 illustrates an evaluation of the state of the ROTT 76 that may be performed by the read response generator 80 to schedule a beat of data for transmission. Thus, the read response generator 80 may be configured to reevaluate the state according to the flowchart each clock cycle.

The embodiment of FIG. 8 schedules individual beats of the remaining beats for transmission. Accordingly, a critical word beat may become valid after a remaining beat (in another entry) has been scheduled but before all remaining beats from the entry are scheduled. Similar to the embodiment of FIG. 6, the read response generator 80 may be configured to mask entries and scan for entries having the CWF-V bit set (blocks 112 and 114). If at least one such entry is detected (decision block 114, "yes" leg), an entry is scheduled (blocks 116, 118, and 120). The CWF-V bit in the scheduled entry may be cleared (block 150).

On the other hand, if there are no set CWF-V bits in entries that are not masked (decision block 114, "no" leg), the read response generator 80 may be configured to scan the REM-V fields for an indication that a remaining beat is ready to transmit (decision block 152). If the REM-V field is a bit vector, for example, the read response generator 80 may scan for bit fields having set bits. If the field is a counter, the read response generator 80 may check the count for a value indicating that there are remaining beats ready. If at least one remaining beat is ready (decision block 152, "yes" leg), the read response generator 80 may be configured to schedule a remaining beat transmission from an entry (blocks 116, 118, and 120). Additionally, the read response generator 80 may be configured to update the REM-Cnt field to indicate the transmission of a beat (block 150). For example, the REM-Cnt field may be initialized to the number of beats and may decremented for each beat transmission. The REM-Cnt field may be a bit vector, and the corresponding bit may be set (or reset) to indicate transmission of a given beat. In another alternative, the count may be initialized to zero and may be incremented for each beat transmission.

Figure 9:
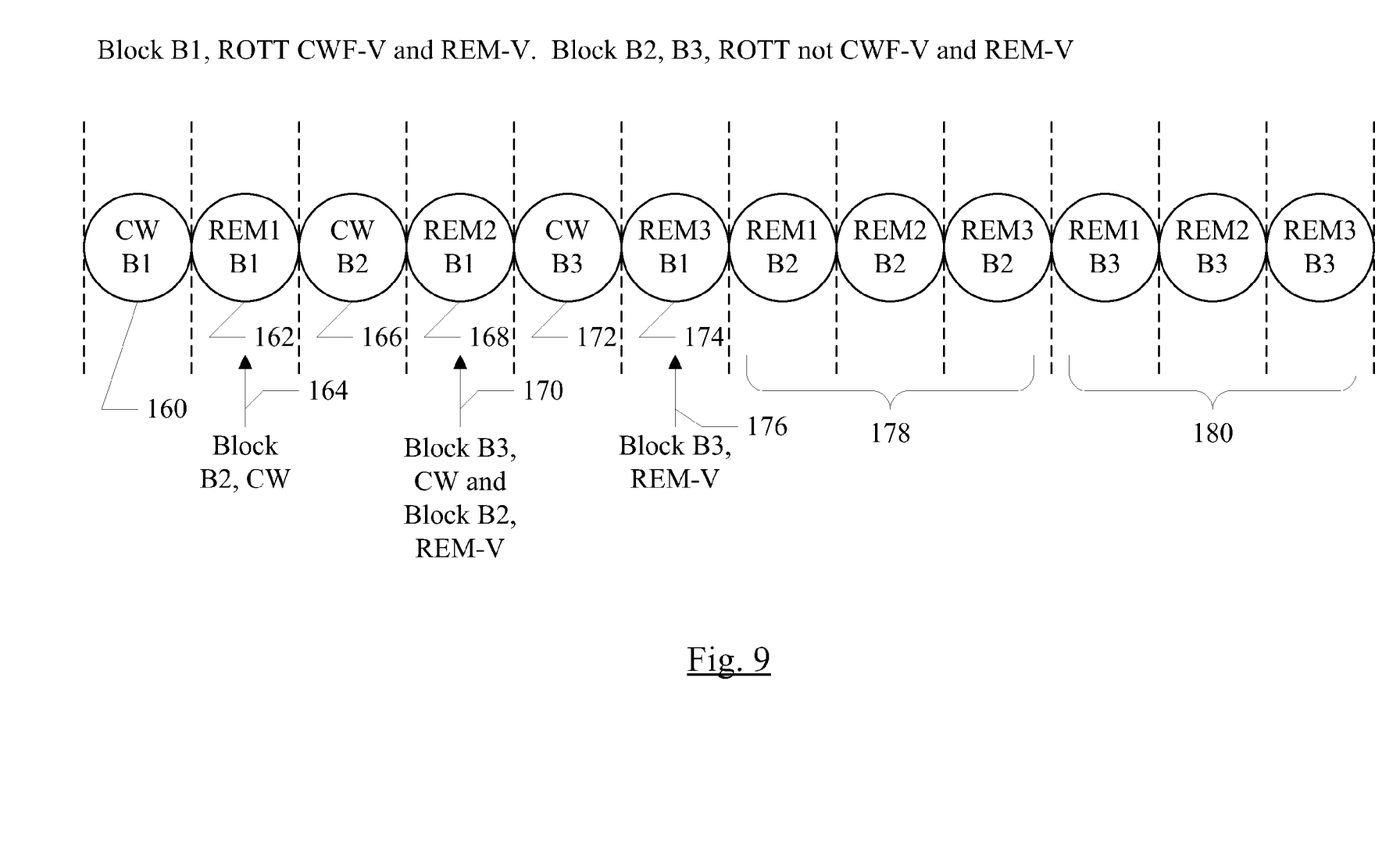
FIG. 9 is a timing diagram illustrating an example of the data transmission for several blocks for the embodiment of FIG. 8.

FIG. 9 is a timing diagram illustrating transmission of beats for an example including blocks B1, B2, and B3. At the beginning of the flowchart, the CWF-V and REM-V indications for block B1 indicate that all beats of block B1 are in the read buffer 84. The blocks B2 and B3 are not yet in the read buffer, and thus the CWF-V and REM-V indications do not indicate valid.

The read response generator 80 detects the CWF-V in the entry for block B1, and thus schedules its critical word beat (reference numeral 160). In the subsequent clock cycle, no other CWF-V bits are set and thus the first remaining beat of block B1 is scheduled (reference numeral 162). Additionally, the CWF-V for block B2 is set in the clock cycle (arrow 164). Accordingly, in the following clock cycle, instead of scheduling another remaining beat, the critical word beat for block B2 is scheduled by the read response generator 80 (reference numeral 166). In the next clock cycle, again no entry has its CWF-V entry set and thus the read response generator 80 schedules another remaining beat of block B1 (reference numeral 168). Additionally, the CWF-V for block B3 is set and the remaining beats for block B2 have also been provided (arrow 170). Accordingly, in the following clock cycle, instead of scheduling another remaining beat, the critical word beat for block B3 is scheduled by the read response generator 80 (reference numeral 172). The last remaining beat of block B1 is then scheduled (reference numeral 174), and the remaining beats of block B3 are also valid (arrow 176). In subsequent clock cycles, the remaining beats of blocks B2 and B3 are transmitted (reference numerals 178 and 180, respectively).

Figure 10:
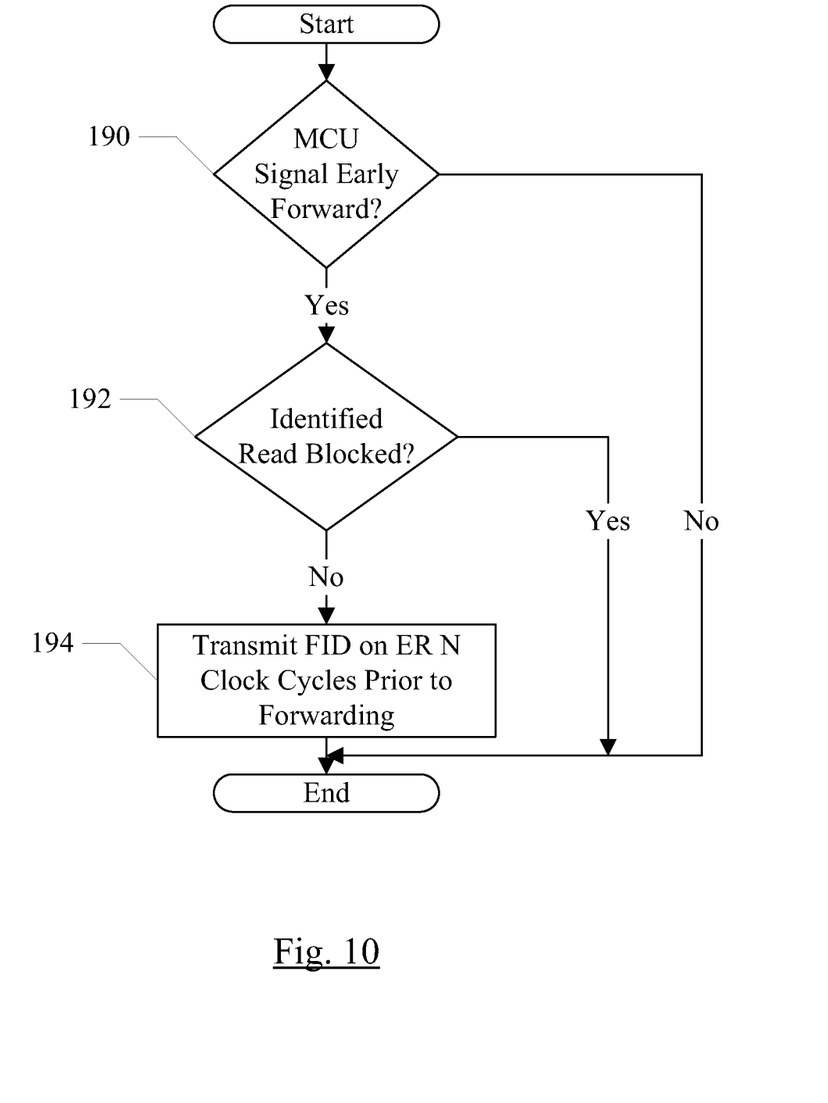
FIG. 10 is a flowchart illustrating early data return operation for one embodiment of the port interface unit.

FIG. 10 is a flowchart illustrating operation of an embodiment of the read response generator 80 in response to an early forward indication from the MCUs 56A-56B. While the blocks are shown in a particular order for ease of understanding, other orders may be used. Blocks may be performed in parallel in combinatorial logic in the read response generator 80. Blocks, combinations of blocks, and/or the flowchart as a whole may be pipelined over multiple clock cycles. The read response generator 80 may be configured to implement the operation shown in FIG. 10. If the MCU signals an early indication of forwarding (decision block 190, "yes" leg), and the corresponding memory operation is not blocked by dependency (decision block 192, "yes" leg), the read response generator 80 may transmit the FID of the memory operation on the ER interface to the CPU block 14 (block 194). The transmission may occur N clock cycles prior to forwarding the data, where N is at least sufficient for the forwarding paths in the CPU block 14 to be configured to forward the data. Since the forwarding paths may be set up for forwarding in response to the ER response, and thus paths may not be available for other purposes in the forwarding clock cycle, the read response generator 80 may be configured to avoid transmitting the response if the corresponding memory operation is blocked (as illustrated by decision block 190).

Figure 11:
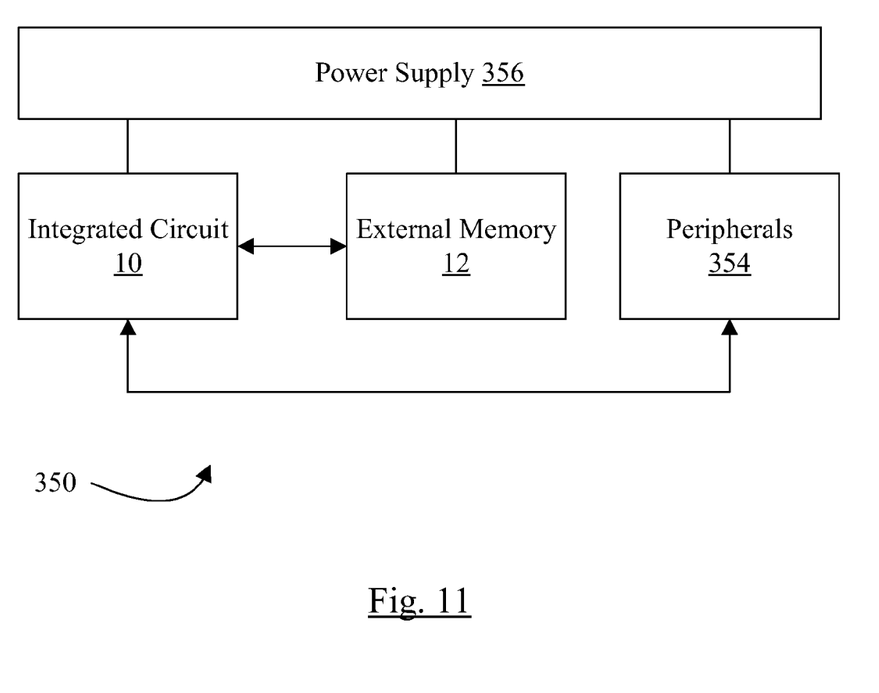
FIG. 11 is a block diagram of one embodiment of a system including an integrated circuit illustrated in FIG. 1.

Turning next to FIG. 11, a block diagram of one embodiment of a system 350 is shown. In the illustrated embodiment, the system 350 includes at least one instance of the integrated circuit 10 coupled to external memory 12 (e.g. the memory 12A-12B in FIG. 1). The integrated circuit 10 is coupled to one or more peripherals 354 and the external memory 12. A power supply 356 is also provided which supplies the supply voltages to the integrated circuit 10 as well as one or more supply voltages to the memory 12 and/or the peripherals 354. In some embodiments, more than one instance of the integrated circuit 10 may be included (and more than one external memory 12 may be included as well).

The peripherals 354 may include any desired circuitry, depending on the type of system 350. For example, in one embodiment, the system 350 may be a mobile device (e.g. personal digital assistant (PDA), smart phone, etc.) and the peripherals 354 may include devices for various types of wireless communication, such as wifi, Bluetooth, cellular, global positioning system, etc. The peripherals 354 may also include additional storage, including RAM storage, solid state storage, or disk storage. The peripherals 354 may include user interface devices such as a display screen, including touch display screens or multitouch display screens, keyboard or other input devices, microphones, speakers, etc. In other embodiments, the system 350 may be any type of computing system (e.g. desktop personal computer, laptop, workstation, net top etc.).

Numerous variations and modifications will become apparent to those skilled in the art once the above disclosure is fully appreciated. It is intended that the following claims be interpreted to embrace all such variations and modifications.

What is claimed is:

1. A memory controller comprising:
a table having a plurality of entries, each entry assignable to a respective read memory operation that is outstanding within the memory controller, wherein each entry includes a first indicator indicating whether or not a critical word of a block that is addressed by the respective read memory operation is ready to be forwarded, and wherein each entry includes a second indictor indicating whether or not a plurality of remaining beats of the block are ready to be forwarded; and
a read response generator coupled to the table and configured to schedule data transmissions on an interface to the memory controller, wherein the read response generator is configured to schedule a beat of data transmission from a first entry of the plurality of entries in response to: (i) the first indicator in the first entry indicating that the critical word is ready to forward; or (ii) the second indicator indicating that the remaining beats of the block are ready to be forwarded and detecting that no entry of the plurality of entries has a critical word available to forward, and wherein the read response generator is configured to transmit one beat of the remaining words in response to scheduling the first entry to forwarding the remaining words, and wherein the read response generator is configured to re-evaluate the plurality of entries, wherein the read response generator is configured to schedule a different entry having a critical word available to forward during the re-evaluation.

2. The memory controller as recited in claim 1 wherein the read response generator is configured to schedule the first entry again subsequent to the re-evaluation to transmit an additional remaining word.

3. The memory controller as recited in claim 1 wherein the read response generator is configured to modify the first indicator in the first entry to indicate that the critical word is not ready to forward in response to scheduling the critical word from the first entry.

4. The memory controller as recited in claim 1 wherein the read response generator is configured to modify the second indicator in the first entry to indicate that the remaining words are not ready responsive to scheduling a final word of the remaining words from the first entry.

5. An apparatus comprising:
a plurality of memory operation sources; and
a memory controller comprising a plurality of ports, wherein each of the plurality of memory operation sources is coupled to one of the plurality of ports, and wherein each port of the plurality of ports includes an independent data path for read data from the memory controller to the memory operation sources that are coupled to that port, and wherein the memory controller is configured to receive a first read memory operation and a second read memory operation on a first port of the plurality of ports, wherein the first read memory operation addresses a first word within a first block that is to be returned on the first port in response to the first read memory operation, and wherein the second read memory operation addresses a second word within a second block that is to be returned on the first port in response to the second read memory operation, and wherein the memory controller is configured to return both the first word and the second word on the first port prior to returning any remaining data in the first block and the second block responsive to both the first word and the second word being available to return, and wherein the memory controller is configured to return one or more beats of the remaining data corresponding to the first block responsive to the second word not being available to return, and wherein the memory controller is configured to reevaluate which data to return in response to returning each beat of data transmitted on the first port, and wherein the memory controller is configured to return the second word responsive to the second word becoming available to return in the re-evaluation, and wherein the memory controller is configured to return remaining beats of the remaining data in the first block subsequent to returning the second word.

6. The apparatus as recited in claim 5 wherein the second word is not available to return responsive to the memory controller detecting a dependency for the second read memory operation on another memory operation in the memory controller.

7. The apparatus as recited in claim 5 wherein the plurality of memory sources comprise a processor unit.

8. The apparatus as recited in claim 7 wherein the processor unit comprises a plurality of processors, and wherein the first read memory operation is a result of a cache miss in a first processor of the plurality of processors, and wherein the second read memory operation is a result of a cache miss in a second processor of the plurality of processors.

9. A memory controller comprising:
a memory having a plurality of entries, each entry assigned to a respective read memory operation that is outstanding within the memory controller, wherein each entry includes a first indicator indicating whether or not a critical word beat of a block that is addressed by the respective read memory operation is ready to be forwarded, and wherein each entry includes a quality of service (QoS) parameter assigned to the respective read memory operation by a source of the read memory operation that transmitted the read memory operation to the memory controller, wherein the QoS parameter indicates a requested level of service for the respective read memory operation; and
a read response generator coupled to the memory and configured to schedule data transmissions on an interface to the memory controller, wherein the read response generator is configured to scan the plurality of entries to identify entries having the first indicator indicating that the critical word beat is ready to forward, and wherein the read response generator is configured to select among two or more entries having the first indicator indicating that the critical word beat is ready responsive to a comparison of the QoS parameters in the two or more entries, wherein the comparison results in selecting the entry of the two or more entries that requests the highest level of service as indicated by the QoS parameters.

10. The memory controller as recited in claim 9 wherein the read response generator is configured to select a first entry for which the QoS parameter indicates a higher level of urgency than the QoS parameters in other ones of the two or more entries.

11. The memory controller as recited in claim 10 wherein the read response generator is configured to select an oldest one of the two or more entries responsive to a match in the QoS parameters.

12. The memory controller as recited in claim 9 wherein each entry of the plurality of entries includes a second indicator indicating whether or not remaining data of the block is ready to be forwarded, and wherein the read response generator is configured to select among two or more entries having the second indictor indicating that remaining data is ready responsive to the QoS parameters in each entry.

13. The memory controller as recited in claim 12 wherein the read response generator is configured to schedule remaining data to be forwarded only if there are no critical word beats available to forward.

14. The memory controller as recited in claim 12 wherein the read response generator is configured to schedule a critical word beat to forward even if there is remaining data ready to forward that is associated with a higher QoS parameter than the critical word beat.

15. The memory controller as recited in claim 12 wherein the read response generator is configured to schedule a critical word beat from a first entry of the plurality of entries even if the second indicator in the first entry indicates that the remaining data is not yet ready to forward.

16. A method comprising:
scheduling data transmissions by a memory controller, wherein the scheduling comprises:
transmitting a first beat of data from a first entry of a plurality of entries in a table in response to a first indicator in the first entry indicating that a critical word of a first block in the first entry is ready to forward, the first beat of data including the critical word;
transmitting a second beat of data from the first entry in response to a second indicator in the first entry indicating that the remaining beats of the block are ready to be forwarded and no entry of the plurality of entries having a critical word available to forward; and
reevaluating the plurality of entries prior to transmitting each beat of data from the first entry; and
transmitting a third beat of data from a different entry having a critical word available to forward during the re-evaluation.

17. The method as recited in claim 16 wherein the scheduling further comprises transmitting a fourth data beat from the first entry again subsequent to reevaluating and subsequent to transmitting the third beat, the fourth beat comprising an additional remaining word from the first entry.

18. The method as recited in claim 16 further comprising modifying the first indicator in the first entry to indicate that the critical word is not ready to forward in response to transmitting the first beat of data from the first entry.

19. The method as recited in claim 16 further comprising modifying the second indicator in the first entry to indicate that the remaining words are not ready responsive to transmitting a final beat of data including a final word of the remaining words from the first entry.

* * * * *